(12) United States Patent
Arumugam et al.

(10) Patent No.: US 9,692,689 B2
(45) Date of Patent: Jun. 27, 2017

(54) REPORTING STATIC FLOWS TO A SWITCH CONTROLLER IN A SOFTWARE-DEFINED NETWORK (SDN)

(71) Applicant: International Business Machines Corporation, Armonk, NY (US)

(72) Inventors: Sivakumar Arumugam, Milpitas, CA (US); Chidambaram Bhagavathiperumal, Santa Clara, CA (US); Dillibabu Kodamala, Sunnyvale, CA (US); Ashok Kumar Mutthaiyanvalasu Somosundaram, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 14/470,393

(22) Filed: Aug. 27, 2014

(65) Prior Publication Data

US 2016/0065454 A1    Mar. 3, 2016

(51) Int. Cl.
*H04L 12/28*     (2006.01)
*H04L 12/721*    (2013.01)
(Continued)

(52) U.S. Cl.
CPC ............. *H04L 45/38* (2013.01); *H04L 45/64* (2013.01); *H04L 47/41* (2013.01)

(58) Field of Classification Search
CPC ..... H04L 45/42; H04L 41/0806; H04L 41/12; H04L 45/64; H04L 49/355; H04L 41/08;
(Continued)

(56) References Cited

U.S. PATENT DOCUMENTS

2011/0271007 A1* 11/2011 Wang .................. H04L 45/306
                                                            709/238
2013/0266007 A1   10/2013 Kumbhare et al.
(Continued)

FOREIGN PATENT DOCUMENTS

WO    WO2013104375       7/2013

OTHER PUBLICATIONS

Open Network Foundation OpenFlow Switch Specification Version 1.4.0 dated Oct. 14, 2013.*
(Continued)

*Primary Examiner* — Shaq Taha
*Assistant Examiner* — Lionel Preval
(74) *Attorney, Agent, or Firm* — Zilka-Kotab, P.C.

(57) ABSTRACT

In one embodiment, a system includes a switch that has a processor and logic integrated with and/or executable by the processor, the logic being configured to create a message indicating addition, modification, or deletion of a static flow in a software defined network (SDN), wherein the static flow includes the switch and at least one other device in the SDN, and send the message to a SDN controller in a SDN-formatted structure. In another embodiment, a method includes creating a message, using a switch, indicating addition, modification, or deletion of a static flow in a SDN, wherein the static flow includes the switch and at least one other device in the SDN, and sending the message to a SDN controller in a SDN-formatted structure. Other systems and methods for reporting static flows to a SDN controller in a SDN are described according to more embodiments.

19 Claims, 5 Drawing Sheets

(51) Int. Cl.
*H04L 12/715* (2013.01)
*H04L 12/891* (2013.01)

(58) Field of Classification Search
CPC ... H04L 41/0813; H04L 45/02; H04L 45/021; H04L 45/22
USPC ........ 370/389, 230, 241; 709/238, 226, 213, 709/217
IPC .................................. H04L 45/38, 45/64, 47/41
See application file for complete search history.

(56) References Cited

U.S. PATENT DOCUMENTS

| | | | | |
|---|---|---|---|---|
| 2013/0272135 A1* | 10/2013 | Leong | ................. | H04L 41/0823 370/241 |
| 2013/0318243 A1* | 11/2013 | Chinthalapati | ......... | H04L 45/52 709/226 |
| 2014/0003232 A1* | 1/2014 | Guichard | ................ | H04L 67/16 370/230 |
| 2014/0143374 A1* | 5/2014 | Huang | ................ | H04L 41/0253 709/217 |
| 2014/0173018 A1* | 6/2014 | Westphal | ............ | H04L 41/0823 709/213 |
| 2014/0371880 A1* | 12/2014 | Lee | ........................ | G05B 15/02 700/20 |
| 2015/0172185 A1* | 6/2015 | Zhang | .................... | H04L 45/42 370/389 |
| 2016/0197818 A1* | 7/2016 | Stuart | .................... | H04L 45/38 370/252 |
| 2016/0337228 A1* | 11/2016 | Cai | ........................ | H04L 45/64 |

OTHER PUBLICATIONS

Salisbury, Brent, "Floodlight OpenFlow Controller: Using the Static Flow Entry Pusher," Dec. 10, 2012, pp. 1-9.

\* cited by examiner

REPORTING STATIC FLOWS TO A SWITCH CONTROLLER IN A SOFTWARE-DEFINED NETWORK (SDN)

BACKGROUND

The present invention relates to network switches and switching, and more particularly, this invention relates to reporting static flows to a software defined network (SDN) controller in a SDN.

One goal of a SDN is to allow the network to be programmable via a SDN controller. The SDN controller is typically physically separated from any of the controlled network switches, but is not necessarily located remotely therefrom. One method that allows for programmability of the network may involve the use of the OpenFlow communication protocol. However, other applications that may allow for programmability of the network either now or in the future may be used, in addition to or in place of OpenFlow, as would be understood by one of skill in the art upon reading the present descriptions.

Other methods that allow for the network to be programmable involve more traditional approaches, such as simple network management protocol (SNMP), network configuration protocol (NetConf), etc. In future versions of OpenFlow, support may be added for programming layer 3 IPv4 and layer 3 IPv6 Forwarding Elements via OpenFlow. Layer 3 forwarding element programming via OpenFlow may add support to program the layer 3 forwarding table, also referred to as a Forwarding Information Base (FIB). In contrast to the Routing Information Base (RIB), the FIB is optimized for fast longest prefix match lookup of a destination internet protocol (IP) address and may be used for data path forwarding. OpenFlow layer 3 forwarding element programming may be used by SDN user applications to program the layer 3 forwarding tables, in some conventional uses.

However, static flows programmed by a switch administrator are not necessarily reported to the switch controller, even when using OpenFlow. Without visibility of these statically programmed flows, the switch controller is not able to completely control flows through the SDN.

SUMMARY

In one embodiment, a system includes a switch that has a processor and logic integrated with and/or executable by the processor, the logic being configured to create a message indicating addition, modification, or deletion of a static flow in a software defined network (SDN), wherein the static flow includes the switch and at least one other device in the SDN, and send the message to a SDN controller in a SDN-formatted structure.

In another embodiment, a method includes creating a message, using a switch, indicating addition, modification, or deletion of a static flow in a SDN, wherein the static flow includes the switch and at least one other device in the SDN, and sending the message to a SDN controller in a SDN-formatted structure.

According to another embodiment, a switch includes a central processing unit (CPU) and logic integrated with and/or executable by the CPU, a switching application specific integrated circuit (ASIC), a first memory configured to store a flow table and a forwarding information database (FIB), and a non-volatile memory (NVM) configured to store a static flow table, wherein the logic is configured to cause the CPU to receive instructions to create, modify, or delete one or more static flows in a SDN, wherein the one or more static flows each include the switch and at least one other device in the SDN, and wherein the instructions are received via command line interface (CLI) from a user, create a message indicating addition, modification, or deletion of the one or more static flows, and send the message to a SDN controller in a SDN-formatted structure.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

According to one embodiment, a mechanism is provided to report static flows in a software defined network (SDN) to a SDN controller. In addition, a mechanism is provided to use Command Line Interface (CLI) for asynchronously notifying the SDN controller when a static flow is added or modified.

In one general embodiment, a system includes a switch that has a processor and logic integrated with and/or executable by the processor, the logic being configured to create a message indicating addition, modification, or deletion of a static flow in a SDN, wherein the static flow includes the switch and at least one other device in the SDN, and send the message to a SDN controller in a SDN-formatted structure.

In another general embodiment, a method includes creating a message, using a switch, indicating addition, modification, or deletion of a static flow in a SDN, wherein the static flow includes the switch and at least one other device in the SDN, and sending the message to a SDN controller in a SDN-formatted structure.

According to another general embodiment, a switch includes a central processing unit (CPU) and logic integrated with and/or executable by the CPU, a switching application specific integrated circuit (ASIC), a first memory configured to store a flow table and a forwarding information database (FIB), and a non-volatile memory (NVM) configured to store a static flow table, wherein the logic is configured to cause the CPU to receive instructions to create, modify, or delete one or more static flows in a SDN, wherein the one or more static flows each include the switch and at least one other device in the SDN, and wherein the instructions are received via CLI from a user, create a message indicating addition, modification, or deletion of the one or more static flows, and send the message to a SDN controller in a SDN-formatted structure.

Figure 1:
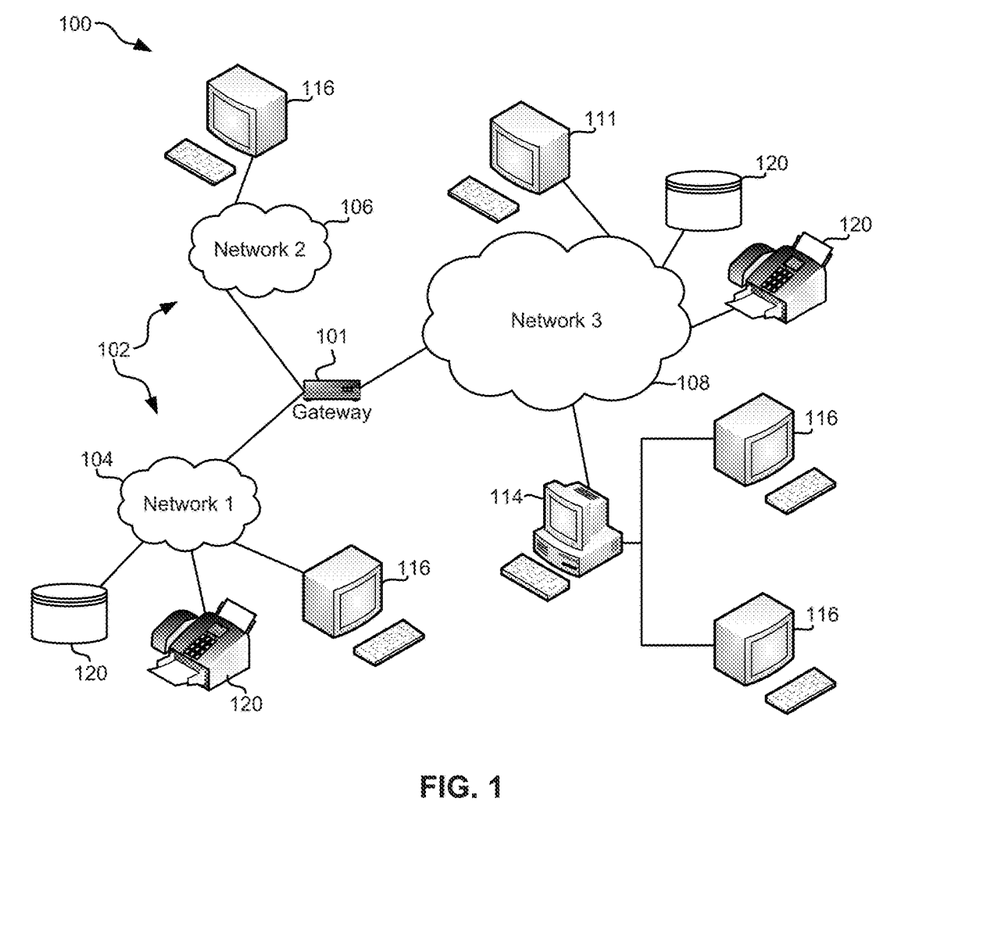
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
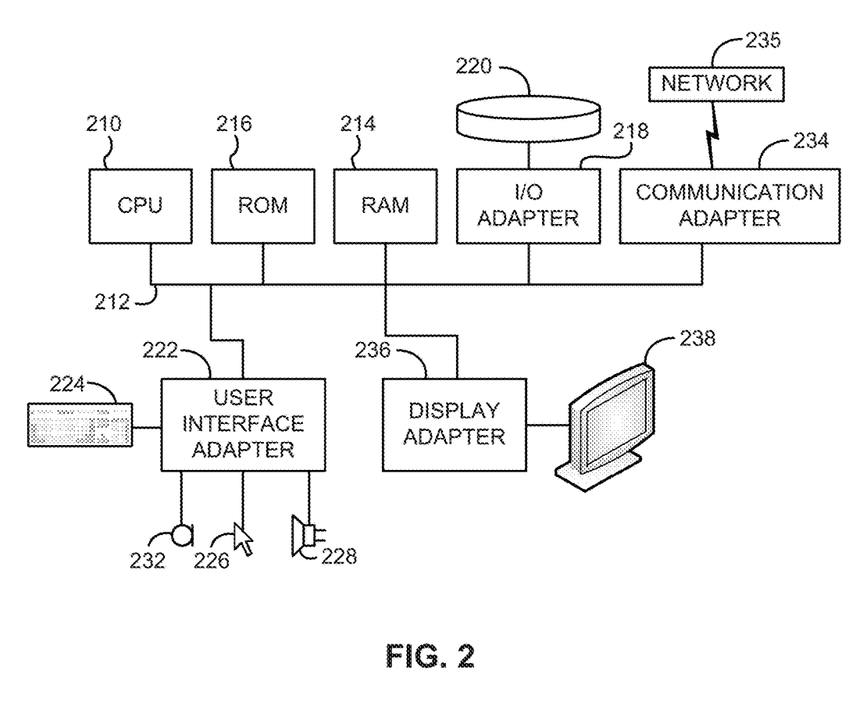
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit 210, such as a microprocessor, and a number of other units interconnected via a system bus 212, according to one embodiment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

For the remainder of these descriptions, when a SDN controller is referred to, this description includes any SDN controllers known in the art, including an OpenFlow controller, among others. Furthermore, when referring to a SDN, the SDN may utilize any known network controlling protocol, including OpenFlow, among others.

By providing notification to a SDN controller that one or more static flows have been defined in a SDN, the SDN controller is aware of all the flows installed in the switch used for traffic forwarding and any security violation issues may be identified. Also, the SDN controller may delete unwanted flows which are statically programmed by the administrator. However, the latest OpenFlow Specification, 1.3.1, does not have a solution to this problem provided therein. As per OpenFlow specification, flow installation always comes from the SDN controller, but there may be situations when there is a controller connection failure during time a switch boot up may cause traffic loss. Static flows configured by a switch administrator may forward the traffic once the controller comes back online, and then the controller may read all flows installed in the switch to get better visibility of network stations and related traffic flows. SDN switches, and particularly OpenFlow-enabled switches, are configured to accept static flow definitions (create static flows) from a switch administrator in order to forward traffic in the absence of the SDN controller. Typically, the static flows are programmed using CLI. Therefore, in order to enable this feature in a SDN, the SDN controller is asynchronously notified of the creation and/or modification (including deletion) of any static flows. This asynchronous notification may be made using a new message type.

In OpenFlow, this message type may be ofp_flow_add, which will be added to the existing OpenFlow specification. For a SDN utilizing another switch control protocol, a suitable message type may be used having some predetermined format and characteristics. On deletion, a notification may be used to indicate the deletion of the static flow similar to a message to delete a configured flow. In OpenFlow, the existing message type ofp_flow_remove may be used (or extended) to notify to the controller of the deletion of a static flow.

When a new flow is configured via CLI, the corresponding flow is converted to a new SDN-formatted structure, such as OpenFlow standard specification format, and relayed to the SDN controller. What is meant by SDN-formatted structure is that the data and information is put into a format which is able to be understood by the SDN controller, and which indicates what information is included in a way which is able to be understood by the SDN controller. In this way, when a flow is being added, the SDN controller is able to determine that the flow is static, what is included in the flow, when the flow is to be used, etc.

When the SDN controller connectivity is not available during flow addition and/or modification, the switch sends all statically configured flows to the SDN controller upon connectivity to the SDN controller being restored.

The new SDN-formatted structure may be used for relaying new flow information to the SDN controller, in a format which the SDN controller understands. The new SDN-formatted structure, in one embodiment, may include the following elements:

```
/* Flow Added/Modified (Switch → controller). */
struct ofp_flow_add {
struct ofp_header header;
uint64_t cookie; /* Special value to identify static flows */
uint16_t priority; /* Priority level of flow entry. */
uint8_t reason; /* One of OFPRA_ADD */
uint8_t table_id; /* ID of the table */
struct ofp_match match; /* Description of match fields. Variable size. */
struct ofp_instruction instructions[0]; /* Instruction set. */
};
enum ofp_flow_add_reason {
OFPRA_ADD = 0, /* Flow added */
OFPRA_MODIFY = 1, /* Flow modified */
};
```

In the above described new SDN-formatted structure, a default for the table identification ("uint8_t table_id") may be 0 or some other predetermined number. The instruction set may include destination address(es) (such as IP, MAC, etc.), changes to flow path, modifications to previous instructions, etc.

In another embodiment, when a flow is deleted via CLI, the corresponding flow may be described in a SDN-formatted structure, such as OpenFlow standard specification format. In one embodiment, an existing flow removal structure may be used with an user defined cookie value to identify the static flow(s). In one embodiment, the existing structure, or a new structure for use in non-OpenFlow systems, may include the following elements:

```
/* Flow removed (datapath → controller). */
struct ofp_flow_removed {
struct ofp_header header;
uint64_t cookie; /* Opaque controller-issued identifier. */
uint16_t priority; /* Priority level of flow entry. */
uint8_t reason; /* One of OFPRR_*. */
uint8_t table_id; /* ID of the table */
uint32_t duration_sec; /* Time flow was alive in seconds. */
uint32_t duration_nsec; /* Time flow was alive in nanoseconds beyond duration_sec. */
```

-continued

```
uint16_t idle_timeout; /* Idle timeout from original flow mod. */
uint16_t hard_timeout; /* Hard timeout from original flow mod. */
uint64_t packet_count;
uint64_t byte_count;
struct ofp_match match; /* Description of fields. Variable size. */
};
```

The uint64_t cookie may be a predetermined identifier that is in sync between the SDN controller and the switch in order to differentiate between static and dynamic flows, according to one embodiment.

Figure 3:
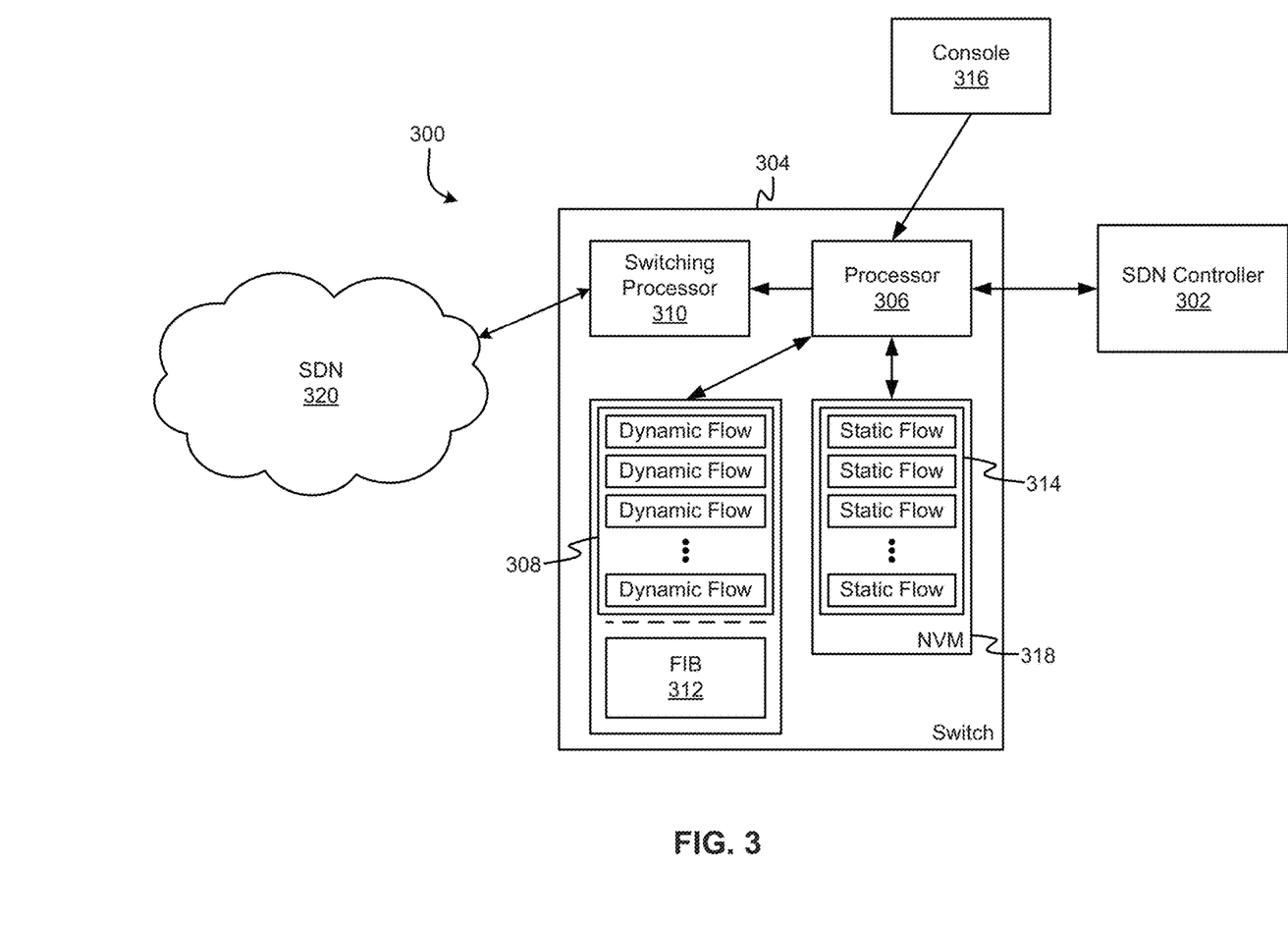
FIG. 3 is a simplified diagram of a system, according to one embodiment.

Now referring to FIG. 3, a system 300 is shown according to one embodiment. The system includes a SDN controller 302, a SDN-enabled switch 304, and a SDN 320. The SDN controller 302 is configured to communicate with a processor 306 (such as a central processing unit (CPU) or some other suitable processor known in the art) of a switch 304 to command the switch 304 and program flows therein in a flow table 308.

The switch 304 comprises the flow table 308 configured to store flows programmed for the switch 304, a switching processor 310 (such as an application specific integrated chip (ASIC) or some other suitable processor known in the art) configured to receive and send packets, a forwarding information base (FIB) 312 configured to store information regarding proper ports on which to send out packets to reach specific addresses, and a table of static flows 314 that are programmable by the processor 306. The table of static flows 314 may be stored in non-volatile memory (NVM), such as Flash memory, non-volatile RAM (NVRAM), phase-change memory (PRAM), solid state memory, etc., so that the static flows are not lost when the switch 304 is powered down, power is interrupted, etc.

In more embodiments, the switch 304 may be a physical switch, a virtual switch, part of a distributed switch, or any other type of switch known in the art. The descriptions of the switch 304 provided previously are for a physical switch, but the embodiments described herein for providing support for statically programmed flows are applicable to any type of switch known in the art.

In one particular embodiment, a system may include a switch 304 comprising a processor 306 and logic integrated with and/or executable by the processor 306, the logic being configured to create a message indicating addition, modification, or deletion of a static flow in a SDN. The static flow includes the switch 304 and at least one other device in the SDN, thereby describing a flow through the SDN from a source to a destination. The logic is also configured to send the message to the SDN controller 302 in a SDN-formatted structure.

The logic may also be further configured to receive instructions to create, modify, or delete the static flow prior to creating the message, the instructions being received via CLI from a user, such as through a console 316 or some other suitable interface to the switch 304.

In another embodiment, the logic may further be configured to receive instructions to create one or more static flows, store the one or more static flows in a static flow table 314 stored in non-volatile memory (NVM) 318, receive one or more dynamic flows from the SDN controller 302, and store the one or more dynamic flows in the flow table 308.

The switching processor 310 may be configured to receive one or more packets, forward the one or more packets according to the one or more dynamic flows stored in the flow table 308 unless the one or more dynamic flows are not available, and forward the one or more packets according to the one or more static flows stored in the static flow table 314 when the one or more dynamic flows are not available.

The one or more static flows stored to the static flow table 314 are used for forwarding packets when the switch 304 is booting up and/or connectivity with the SDN controller 302 is interrupted. Also, the processor 306 may be further configured to send a message to the SDN controller 302 when the FIB 312 and/or the flow table 308 is empty.

The SDN controller 302 may be configured to create one or more dynamic flows, send the one or more dynamic flows to the switch 304, and monitor and update the one or more dynamic flows as conditions change in the SDN, switches are added and/or removed, connections are added, fail, etc.

The processor 306 may be configured to receive instructions to create, modify, or delete one or more static flows in the SDN, the one or more static flows each including the switch 304 and at least one other device in the SDN, and the instructions being received via CLI from a user, create a message indicating addition, modification, or deletion of the one or more static flows, and send the message to the SDN controller 302 in a SDN-formatted structure.

In a further embodiment, the processor 306 may be configured to store the one or more static flows in the static flow table 314, receive one or more dynamic flows from the SDN controller 302, and store the one or more dynamic flows in the flow table 308.

Figure 4:
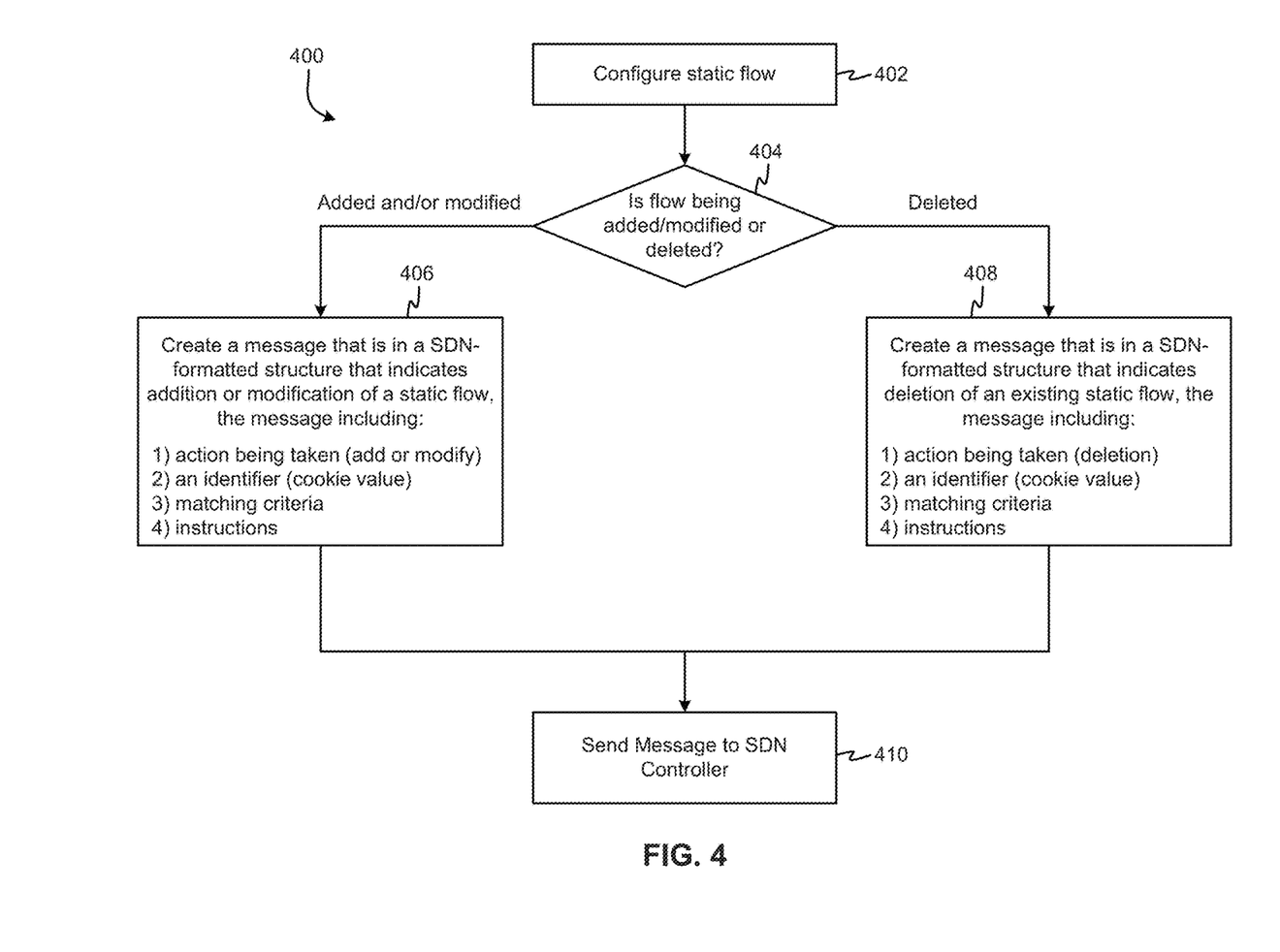
FIG. 4 shows a flowchart of a method, according to one embodiment.

Now referring to FIG. 4, a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a SDN controller, a processor (such as a CPU, an ASIC, an FPGA, etc.), a module, a function block, a switch, a router, etc., in various approaches.

As shown in FIG. 4, method 400 may initiate with operation 402, where one or more flows are configured. The flows may be statically configured in a static flow table of a switch by a switch administrator in one embodiment. In another embodiment, the static flows may be programmed to provide a switch with a base set of flows to utilize in case dynamic flows provided by the SDN controller are no longer accessible, erased, deleted, etc.

In operation 404, it is determined whether the one or more flows are being added and/or modified (e.g., the one or more flows are new flows or modified flows) or being deleted (e.g., the one or more flows are being removed from the static flow table). When the one or more flows are being added and/or modified, method 400 continues to operation 406; otherwise, when the one or more flows are being deleted, method 400 continues to operation 408.

In operation 406, a message is created that is in a SDN-formatted structure that indicates addition or modification of a static flow. This message is populated with parameters and/or variables identifying at least the action being taken (add or modify) and an identifier, such as a cookie value, which is in sync between the SDN controller and the switch and is issued by the SDN controller for identification of this flow. When operating in an OpenFlow environment, a new ofp_flow_add command may be used, and may include at least: the cookie value indicating the static flow, matching criteria that indicates which static flow is being added/modified, instructions regarding how to proceed, and a reason for the action (e.g., adding a new static flow or modifying an existing static flow).

In operation 408, a message is created that is in a SDN-formatted structure that indicates deletion of a static flow. This message is populated with parameters and/or variables identifying at least the action being taken (delete) and an identifier, such as a cookie value, which is in sync between the SDN controller and the switch and is issued by the SDN controller for identification of this flow. When operating in an OpenFlow environment, an existing ofp_flow_removed command may be used, and may include at least: the cookie value indicating the static flow, matching criteria that indicates which static flow is being deleted, instructions regarding how to proceed, and a reason for the action (e.g., deleting an existing static flow).

In operation 410, the message is relayed to the SDN controller, thereby alerting the SDN controller of the addition, deletion, or change to the static flow.

Upon receiving the message, the SDN controller may store the information regarding the new static flow or changes to an existing static flow to a memory for use in distributing traffic across the network when appropriate, based on the updated or created static flow. In another embodiment, an existing static flow may be deleted from such a memory in response to receiving the message indicating deletion of a specific static flow.

Figure 5:
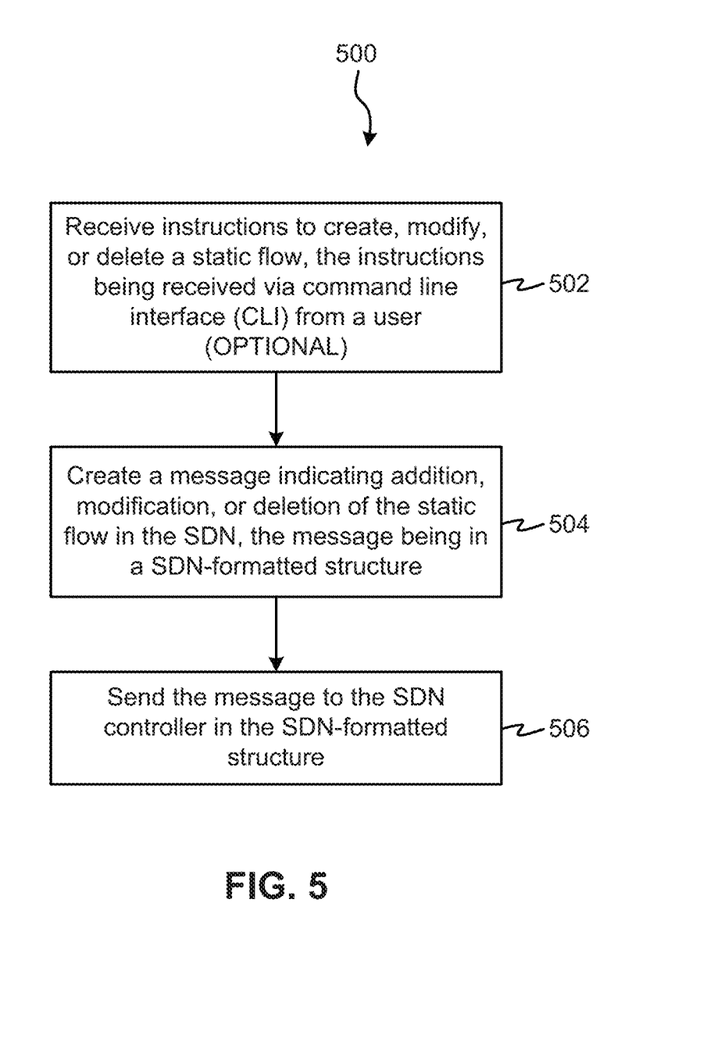
FIG. 5 shows a flowchart of a method, according to another embodiment.

Now referring to FIG. 5, a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in one embodiment, the method 500 may be partially or entirely performed by a SDN controller, a processor (such as a CPU, an ASIC, an FPGA, etc.), a module, a function block, a switch, a router, etc., in various approaches.

As shown in FIG. 5, method 500 may initiate with optional operation 502, where instructions are received to create, modify, or delete a static flow, the instructions being received via command line interface (CLI) from a user. The static flow includes the switch and at least one other device in the SDN. These instructions may be received prior to creating any messages to a SDN controller indicating such static flow creation, modification, or deletion.

In operation 504, a message is created indicating addition, modification, or deletion of the static flow in the SDN. This message is in a SDN-formatted structure so that the SDN controller is able to interpret the information included therein.

In operation 506, the message is sent to the SDN controller in the SDN-formatted structure. As previously described, when operating in OpenFlow, the SDN-formatted structures may be used, depending on whether the message is intended to delete or add/modify the static flow.

In another embodiment, method 500 may further comprise receiving instructions to create additional static flows, storing the additional static flows in a static flow table stored in non-volatile memory, receiving one or more dynamic flows from the SDN controller, and storing the one or more dynamic flows in a flow table.

In yet another embodiment, the instructions to create the one or more static flows may be programmed by a user via CLI, or some other suitable user interface to the switch known in the art. In this way, the user is able to program static flows which may be used for traffic forwarding in situations where the FIB is unavailable and/or does not have any entries therein for forwarding packets, such as during switch boot up and/or restart, when communication with the SDN controller is interrupted, etc. Interruptions to communication with the SDN controller results in situations where flows may become stale and changes or modifications to the SDN will not be reflected in the stored dynamic flows, thereby resulting in packets being dropped.

In another embodiment, method 500 may further include receiving one or more packets, forwarding the one or more packets according to the one or more dynamic flows unless the one or more dynamic flows are not available, and when the one or more dynamic flows are not available, forwarding the one or more packets according to the one or more static flows. In this way, control of where packets are forwarded may be controlled by the SDN controller, by providing the one or more dynamic flows, under normal operating conditions. However, in situations where the FIB is unavailable and/or does not have any entries therein for forwarding packets, the flow table is empty, etc., such as during switch boot up and/or restart, when communication with the SDN controller is interrupted, etc., packets are not dropped, as they may be forwarded according to the static flows programmed into the static flow table by the user.

In any embodiment described herein, the SDN controller and the switch may both operate according to OpenFlow standards or some other suitable SDN protocol known in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a switch, the switch comprising a processor and logic integrated with and/or executable by the processor, the logic being configured to cause the processor to:
create a message indicating addition, modification, or deletion of a static flow in a software defined network (SDN), wherein the static flow includes the switch and at least one other device in the SDN;
send the message to a SDN controller in a SDN-formatted structure; and
send a second message to the SDN controller in response to a determination that a forwarding information base (FIB) and/or a flow table of the switch is empty, the second message indicating that the FIB and/or the flow table is empty.

2. The system as recited in claim 1, wherein the logic is further configured to cause the processor to receive instructions to create, modify, or delete the static flow prior to creating the message, the instructions being received via command line interface (CLI) from a user.

3. The system as recited in claim 1, wherein the logic is further configured to cause the processor to:
receive instructions to create one or more static flows;
store the one or more static flows in a static flow table stored in non-volatile memory;
receive one or more dynamic flows from the SDN controller; and store the one or more dynamic flows in a flow table.

4. The system as recited in claim 3, wherein the instructions to create the one or more static flows are programmed by a user via command line interface (CLI).

5. The system as recited in claim 3, wherein the logic is further configured to cause the processor to:
receive one or more packets;
forward the one or more packets according to the one or more dynamic flows, unless the one or more dynamic flows are not available; and
forward the one or more packets according to the one or more static flows in response to a determination that the one or more dynamic flows are not available.

6. The system as recited in claim 3, wherein the one or more static flows stored to the static flow table are used for forwarding packets in response to a determination that the switch is booting up and/or connectivity with the SDN controller is interrupted.

7. The system as recited in claim 1, wherein the SDN controller and the switch both operate according to Open Flow standards, and wherein the logic is further configured to cause the processor to:
forward traffic according to one or more dynamic flows stored to a flow table and programmed by the SDN controller unless the one or more dynamic flows are not available; and forward traffic according to one or more static flows stored to the switch in response to a determination that the one or more dynamic flows are not available.

8. The system as recited in claim 1, further comprising the SDN controller, the SDN controller being configured to:
create one or more dynamic flows;
send the one or more dynamic flows to the switch; and
monitor and update the one or more dynamic flows.

9. A method, comprising:
a switch creating a message indicating addition, modification, or deletion of a static flow in a software defined network (SDN), wherein the static flow includes the switch and at least one other device in the SDN; and
the switch sending the message to a SDN controller in a SDN-formatted structure; and
the switch sending a second message to the SDN controller in response to a determination that a forwarding information base (FIB) and/or a flow table of the switch is empty, the second message indicating that the FIB and/or the flow table is empty.

10. The method as recited in claim 9, further comprising the switch receiving instructions to create, modify, or delete the static flow prior to creating the message, the instructions being received via command line interface (CLI) from a user.

11. The method as recited in claim 9, further comprising:
the switch receiving instructions to create one or more static flows; the switch storing the one or more static flows in a static flow table stored in non-volatile memory;
the switch receiving one or more dynamic flows from the SDN controller; and the switch storing the one or more dynamic flows in a flow table.

12. The method as recited in claim 11, wherein the instructions to create the one or more static flows are programmed by a user via command line interface (CLI).

13. The method as recited in claim 11, further comprising:
the switch receiving one or more packets;
the switch forwarding the one or more packets according to the one or more dynamic flows, unless the one or more dynamic flows are not available; and
the switch forwarding the one or more packets according to the one or more static flows in response to a determination that the one or more dynamic flows are not available.

14. The method as recited in claim 9, wherein the SDN controller and the switch both operate according to Open Flow standards.

15. A switch, comprising:
a central processing unit (CPU) and logic integrated with and/or executable by the CPU;
a switching application specific integrated circuit (ASIC);
a first memory configured to store a flow table and a forwarding information base (FIB); and
a non-volatile memory (NVM) configured to store a static flow table, wherein the logic is configured to cause the CPU to:
receive instructions to create, modify, or delete one or more static flows in a software defined network (SDN), wherein the one or more static flows each include the switch and at least one other device in the SDN, and wherein the instructions are received via command line interface (CLI) from a user;
create a message indicating addition, modification, or deletion of the one or more static flows; and
send the message to a SDN controller in a SDN-formatted structure; and
send a second message to the SDN controller in response to a determination that a forwarding information base (FIB) and/or a flow table of the switch is empty, the second message indicating that the FIB and/or the flow table is empty.

16. The switch as recited in claim 15, wherein the logic is further configured to cause the CPU to:
store the one or more static flows in the static flow table;
receive one or more dynamic flows from the SDN controller; and store the one or more dynamic flows in the flow table.

17. The switch as recited in claim 16, wherein the switching ASIC is configured to:
receive one or more packets;
forward the one or more packets according to the one or more dynamic flows, unless the one or more dynamic flows are not available; and
forward the one or more packets according to the one or more static flows in response to a determination that the one or more dynamic flows are not available.

18. The switch as recited in claim 16, wherein the one or more static flows stored to the static flow table are used for forwarding packets in response to a determination that the switch is booting up and/or connectivity with the SDN controller is interrupted.

19. The switch as recited in claim 15, wherein the switch operates according to Open Flow standards.

* * * * *